United States Patent
Chafin et al.

[11] Patent Number: 5,434,361
[45] Date of Patent: Jul. 18, 1995

[54] THERMOPLASTIC TERMINAL ENCAPSULATION METHOD AND APPARATUS

[75] Inventors: William J. Chafin, Alexandria; Michael C. Lewman, Muncie; David M. Kroll, Anderson, all of Ind.

[73] Assignee: General Motors Corporation, Detroit, Mich.

[21] Appl. No.: 293,618

[22] Filed: Aug. 22, 1994

Related U.S. Application Data

[62] Division of Ser. No. 122,084, Sep. 17, 1993.

[51] Int. Cl.⁶ ............................................. H02G 15/08
[52] U.S. Cl. .................................. 174/76; 174/74 R; 174/94 R
[58] Field of Search ............... 174/76, 94 R, 74 R, 174/74 A, 84 R; 228/110.1, 1.1; 156/73.1, 73.2, 309.6, 155, 172; 264/23, 263, 272.11; 29/857, 867, 858, 860, 619, 877, 878

[56] References Cited

U.S. PATENT DOCUMENTS

| | | | |
|---|---|---|---|
| 3,206,833 | 9/1965 | Yonkers | 29/878 |
| 3,310,718 | 3/1967 | Luafer | 29/877 |
| 3,333,047 | 7/1967 | Geoffroi | 174/94 R |
| 3,440,118 | 4/1969 | Obeda | 156/73.2 |
| 3,546,368 | 12/1970 | Zaleski | 174/94 R |
| 3,648,337 | 3/1972 | Greskamp et al. | 29/25.42 |
| 3,649,743 | 3/1972 | O'Loughlin | 174/84 R |
| 3,769,703 | 11/1973 | Geoming | 29/867 |
| 3,851,298 | 11/1974 | Sokolov | 174/94 R |
| 3,879,239 | 4/1975 | Rager | 156/73.1 |
| 4,473,715 | 9/1984 | Bienhaur et al. | 174/87 |
| 4,528,750 | 7/1985 | Fink | 29/878 |
| 4,712,723 | 12/1987 | Moll et al. | 228/111 |
| 4,730,764 | 3/1988 | Hawkins et al. | 228/1.1 |
| 4,860,433 | 8/1989 | Miura | 29/860 |
| 4,922,072 | 5/1990 | Topel et al. | 219/56.1 |
| 5,057,661 | 10/1991 | Banner | 219/56.22 |
| 5,140,746 | 8/1992 | Debbaut | 29/859 |
| 5,244,532 | 9/1993 | Wadium | 156/73.1 |
| 5,300,162 | 4/1994 | Brockmeyer | 264/23 |

FOREIGN PATENT DOCUMENTS

| | | | |
|---|---|---|---|
| 581997 | 8/1959 | Canada | 174/94 R |
| 2095966 | 1/1972 | France | 228/1.1 |

Primary Examiner—Morris H. Nimmo
Attorney, Agent, or Firm—Anthony Luke Simon

[57] ABSTRACT

A method of terminating a wire comprises the steps of (i) winding the wire around a an end portion of a terminal, (ii) placing a plastic sleeve having a first cavity into a second cavity in an ultrasonic horn, (iii) inserting the portion of the terminal around which the wire is wound into the first cavity of the plastic sleeve while the plastic sleeve is within the second cavity in the ultrasonic horn, (iv) activating the ultrasonic horn causing the plastic sleeve to melt and flow around the terminal and wound wire, (v) deactivating the ultrasonic horn, and (vi) removing the terminal and coil from the horn.

3 Claims, 4 Drawing Sheets

THERMOPLASTIC TERMINAL ENCAPSULATION METHOD AND APPARATUS

This is a division of application Ser. No. 08/122,084 filed on 17 Sep. 1993.

This invention relates to a method and apparatus for attaching coil terminations to terminals.

BACKGROUND OF THE INVENTION

In a known method of coil termination, the end of the coil wire is stripped by a mechanically abrasive method. One such method includes an operator inserting the wire end between two abrasive wheels that grind off the insulation and pulling the wire out of the wheels. The operator checks the wire to determine if enough insulation is removed. If any insulation remains on the wire end, the operator reinserts the wire into the grinding wheels.

Often, multiple passes through the grinding wheels are necessary. The grinding wheels tend to reduce the cross-sectional area of the wire, as some of the copper is removed with the stripping process. This reduces the tensile strength of the wire.

The wire is then wrapped around a terminal using a wire wrap device such as an air powered wire wrap gun. In this process, the wire digs into the terminal in order to establish electrical continuity. Fractures can occur in the wire if the wire has already been damaged during the stripping process. The coil wire is then fluxed and soldered to the terminal to complete the process.

SUMMARY OF THE PRESENT INVENTION

Advantageously, the present invention provides a method and apparatus for terminating coil wire that eliminates the steps of stripping the wire, wire wrapping the wire with a wire wrapping machine, fluxing and soldering the wire. Advantageously, the method and apparatus of this invention terminate a coil wire without reducing the cross-sectional area of the wire and without reducing the tensile strength of the wire. Advantageously, the method and apparatus of this invention are less labor intensive than typical wire wrapping methods as this invention eliminates the necessity of having an operator physically strip the wire and wire wrap the wire. Advantageously, the method and apparatus of this invention reduce the use of lead in wire terminations by eliminating the soldering step.

The advantageous method and apparatus of this invention use plastic encapsulation to terminate a coil wire to a terminal.

Advantageously, the method of this invention comprises the steps of (i) winding the coil wire, which need not be stripped, around a terminal, (ii) placing a plastic sleeve having a first cavity into a second cavity in an ultrasonic horn, (iii) inserting the portion of the terminal around which the wire is wound into the first cavity of the plastic sleeve while the plastic sleeve is within the ultrasonic horn, (iv) activating the ultrasonic horn causing the plastic sleeve to melt and flow around the wire, (v) deactivating the ultrasonic horn and (vi) removing the terminal and coil from the horn.

Advantageously, the apparatus of this invention comprises a terminal having an end portion around which is wound termination wire, and a plastic sleeve molded around the end portion of the terminal and the wound wire, wherein the wound wire makes metal-to-metal contact with the terminal at various points in the winding.

A more detailed description of this invention is set forth below.

DETAILED DESCRIPTION OF THE INVENTION

Figure 1:
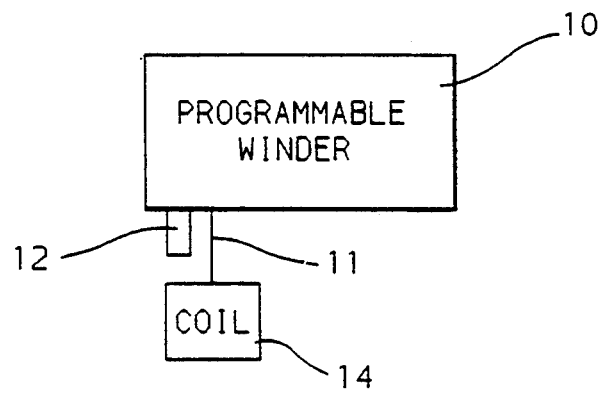
FIG. 1 is a schematic diagram of the first part of the termination system of this system.

Referring to FIG. 1, a coil 14 includes wire 11 to be terminated, according to this invention, to a terminal 12 inserted in programmable winder 10 of a type well known to those skilled in the art. Wire 11 comprises a metal core, typically copper, with a thin layer of polymer material insulation and is of a type well known to those skilled in the art for uses in the manufacture of coil devices, such as transformers, solenoid motors, inductors, etc.

Terminal 12 is the terminal used for providing electrical connection to the coil device and is of a type generally well known to those skilled in the art. Terminal 12 generally comprises a metal cylindrical member of copper, brass, aluminum, stainless steel, etc., and may have a coating such as tin. The exact size and shape of terminal 12 will vary from implementation to implementation.

The programmable winder 10 winds the terminating portion of wire 11 around an end of terminal 12 and cuts the wire 11. In this first step of the termination process of this invention, the wire 11 need not be stripped and may be wound around terminal 12 with its insulation on.

Figure 2:
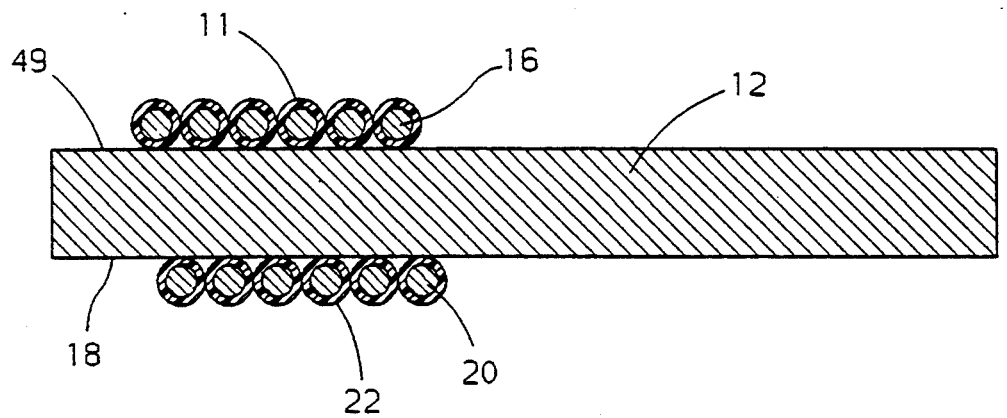
FIG. 2 illustrates a terminal after it has been through the apparatus in FIG. 1.

Referring to FIG. 2, the terminal 12 is shown with wire 11 having a portion 16 wound around the end 18 of terminal 12. As illustrated, the wire 11 still has its insulation 22 and, at this point, unless there are gaps in the insulation, typically does not make electrical contact with terminal 12.

Note that the winding of the wire 11 by programmable winder 10 is distinct from wire wrapping such as used in the typical prior art. Wire wrapping requires the wire to be stripped before it is wound, wherein stripping the wire is not required according to this invention. Wire wrapping requires greater wrapping tension than the winding step of this invention so that the wrapped wire can "dig" into the terminal.

Figure 3:
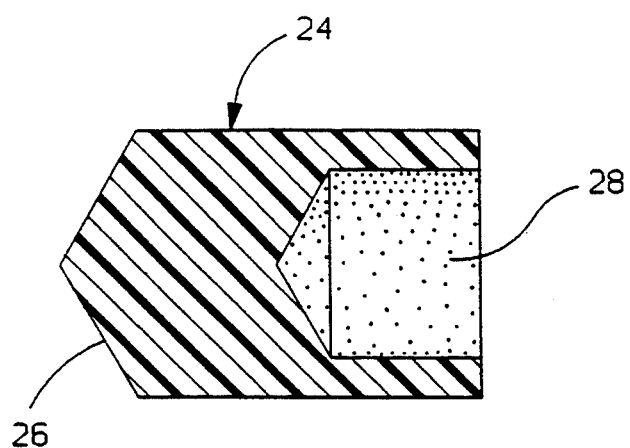
FIG. 3 illustrates a plastic cap used to terminate the wire according to this invention.
Figure 4:
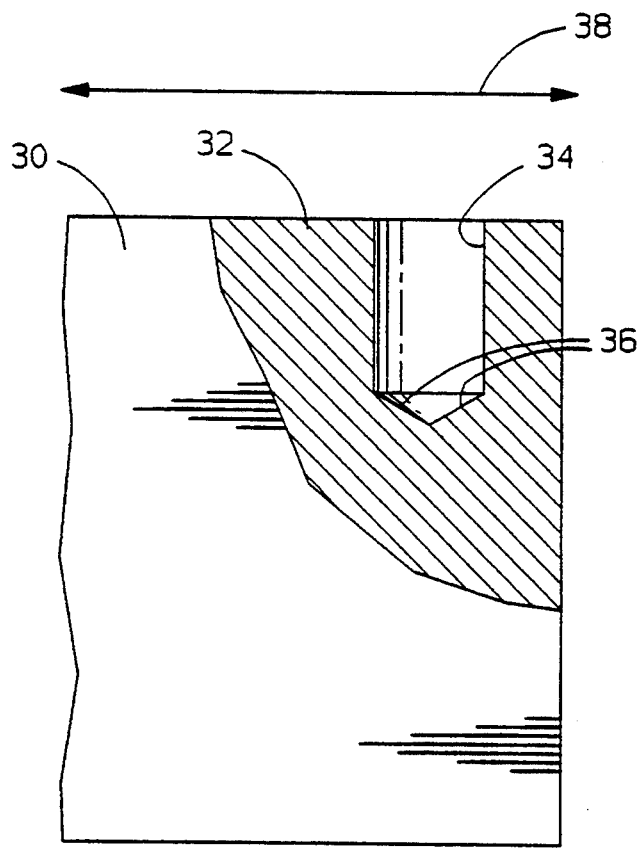
FIG. 4 illustrates an ultrasonic horn according to this invention.

Referring now to FIG. 3, the plastic encapsulation according to this invention is formed from a pre-molded plastic sleeve 24 having an end 26 shaped to fit within cavity 34 of ultrasonic weld horn 30 shown in FIG. 4. Plastic sleeve 24 also includes a cavity 28, which receives the terminal and wound wire shown in FIG. 2.

Referring now to FIG. 4, the ultrasonic weld horn 30 is shown with cut away portion 32 revealing cavity 34 and inner walls 36, shaped to receive plastic sleeve 24. Arrows 38 illustrate the direction of ultrasonic movement of horn 30, when activated.

Figure 5:
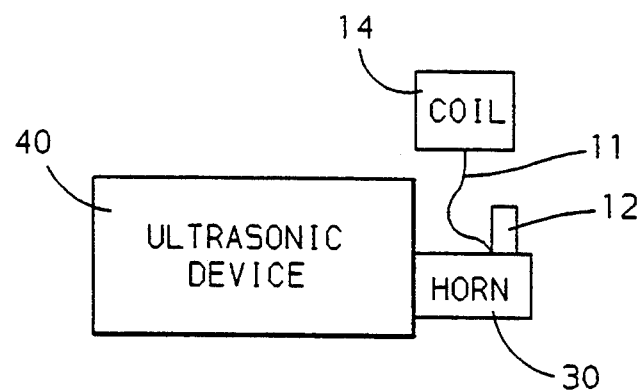
FIG. 5 illustrates a second apparatus in the manufacturing system of this invention.

Referring to FIG. 5, the ultrasonic heating station is shown comprising ultrasonic device 40 for activating ultrasonic horn 30. Ultrasonic device 40 typically comprises an ultrasonic actuator that creates ultrasonic vibrations in a receptacle, to which is mounted a horn such as horn 30. The shape and size of horn 30 varies from implementation to implementation to fit the object to which ultrasonic energy is to be transferred. Ultrasonic devices such as device 40 are easily obtainable by those skilled in the art.

The plastic sleeve 24, at this point, is within the cavity 34 of the horn 30 and the wound portion 16 of wire 11 and end 18 of terminal 12 are inserted in the cavity 28 of the plastic sleeve 24.

Figure 6:
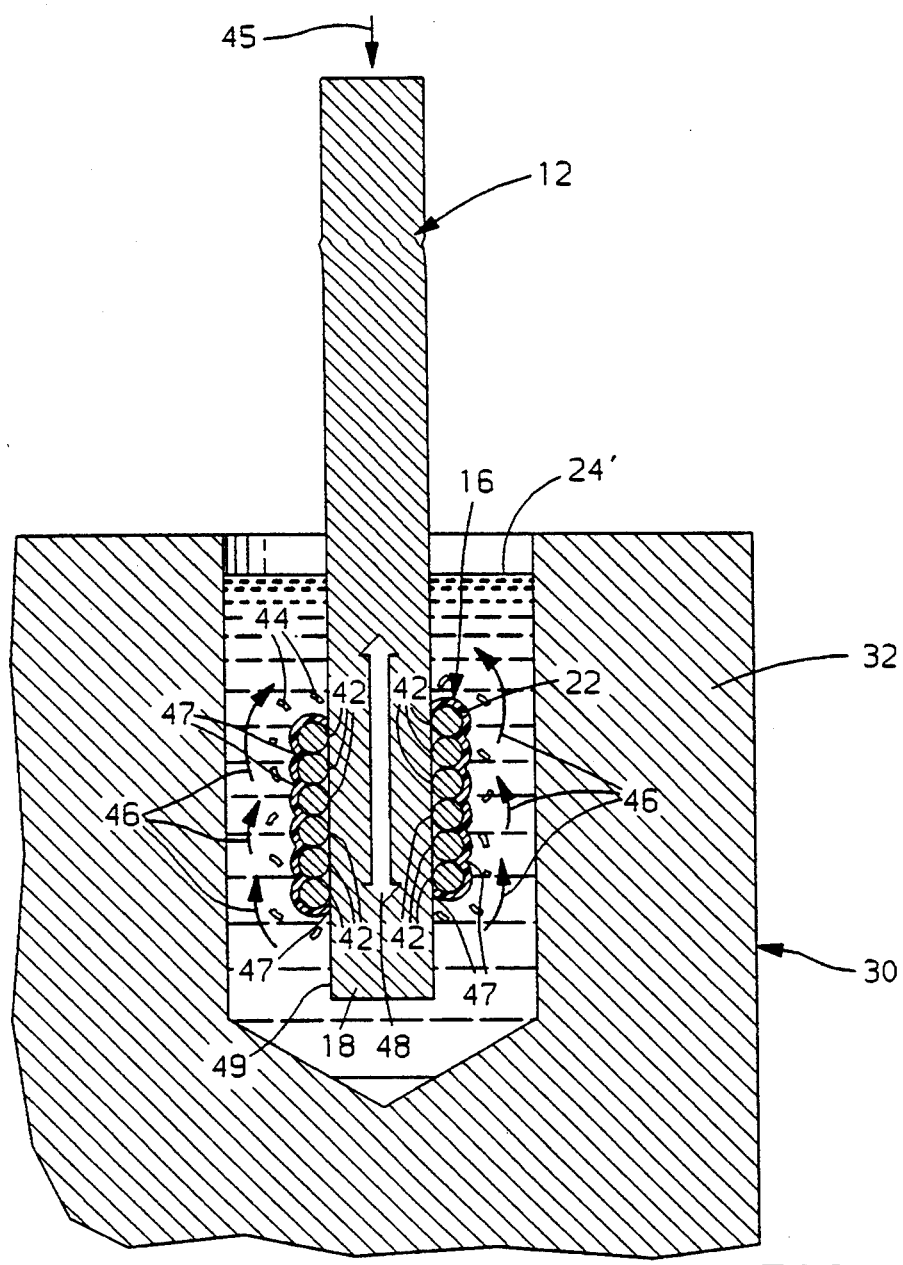
FIG. 6 illustrates he ultrasonic encapsulation including reflowing of the plastic cap according to this invention.

Referring now also to FIG. 6, when the ultrasonic horn is activated, the ultrasonic vibrations occurring at a predetermined frequency, for example 40 kHz., create a cavitation effect on the plastic sleeve 24. The cavitated sleeve 24' becomes heated, melts and flows around the vibrating wire portion 16 in terminal 12. Arrows 46 illustrate the flow of the melted sleeve 24' which at this point is in a substantially fluid state. Slight force in the direction of arrow 45 on terminal 12 forces terminal 12 into the melted cap and forces the flow of the plastic, as shown by the arrows 46. As the fluid plastic flows, it flows into the cavities and irregular crevices 47 characteristic of the contour of the wire 16 wound around terminal 12.

The ultrasonic vibrations of the horn 32 cause the portion of the wire 16, wound around the end 18 of terminal 12, to rub against terminal 12 at contact points 42. The direction of the rubbing of wires 16 against terminal 12 is represented by arrows 48. The combination of this rubbing and the heating caused by the ultrasonic horn remove the portion of the insulation between the wire 16 and terminal 12 so that the wire 16 makes electrical contact with terminal 12. The removed portions of insulation are represented by reference 44, showing the removed portions dispersing into the reflowing plastic sleeve 24'.

The heat caused by the device may also reflow any coatings, such as tin, on terminal 12. Reflowing of the tin coating causes some of the coating to flow around the wire portion 16 contacting the terminal 12, aiding in the bonding and securing of electrical contact between the wire 16 and terminal 12. The tin is represented by reference 49.

After a predetermined ultrasonic heating period, the ultrasonic device is turned off and the plastic sleeve rehardens. The terminal, having the connected wire and encapsulated plastic sleeve, is now removed from the horn and appears as represented in FIG. 7.

Figure 7:
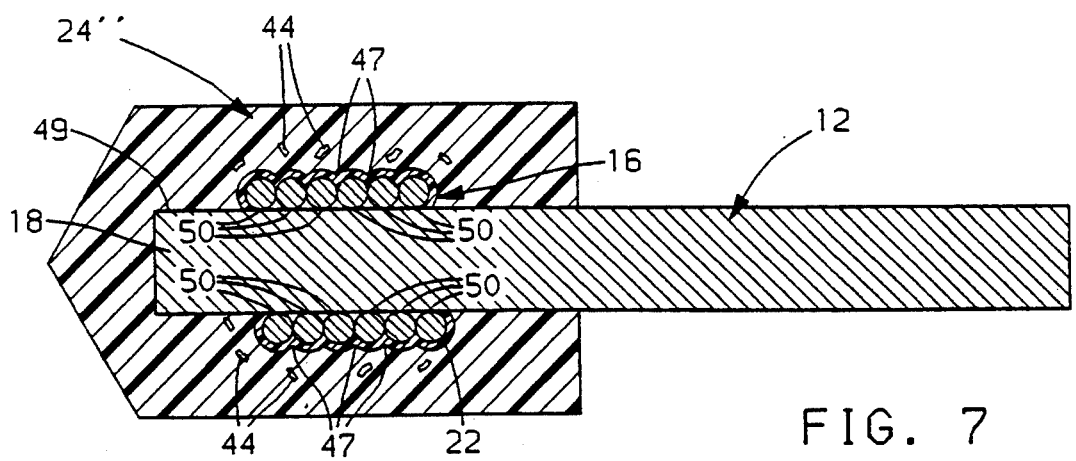
FIG. 7 illustrates the resulting terminated wire according to this invention.

Referring to FIG. 7, the coil termination according to this invention shown, includes the plastic encapsulation 24" molded around the wire portion 16 and end 18 of terminal 12. Due to the flowing of the plastic during the ultrasonic heating, the encapsulation 24" is molded to the contour of the wire 16 wound around terminal 12, having flowed into the cavities and irregular shaped crevices characteristic of the contour of the wire 16 and terminal 12. The portion 16 of the wire 11 still retains some insulation at locations not contacting terminal 12 and the wire 16 makes electrical contact with terminal 12 at the points 50 shown. Particles 44 of the insulation that were removed from the wire 16 are dispersed through the hardened plastic encapsulation 24" as shown.

The size and shape of the plastic sleeve 24 will vary from implementation-to-implementation depending on the size of the terminal and gauge of the wire to be terminated. The ultrasonic heating device frequency and activation time will vary from implementation-to-implementation and can be easily determined by one skilled in the art using the information recited herein.

Figure 8:
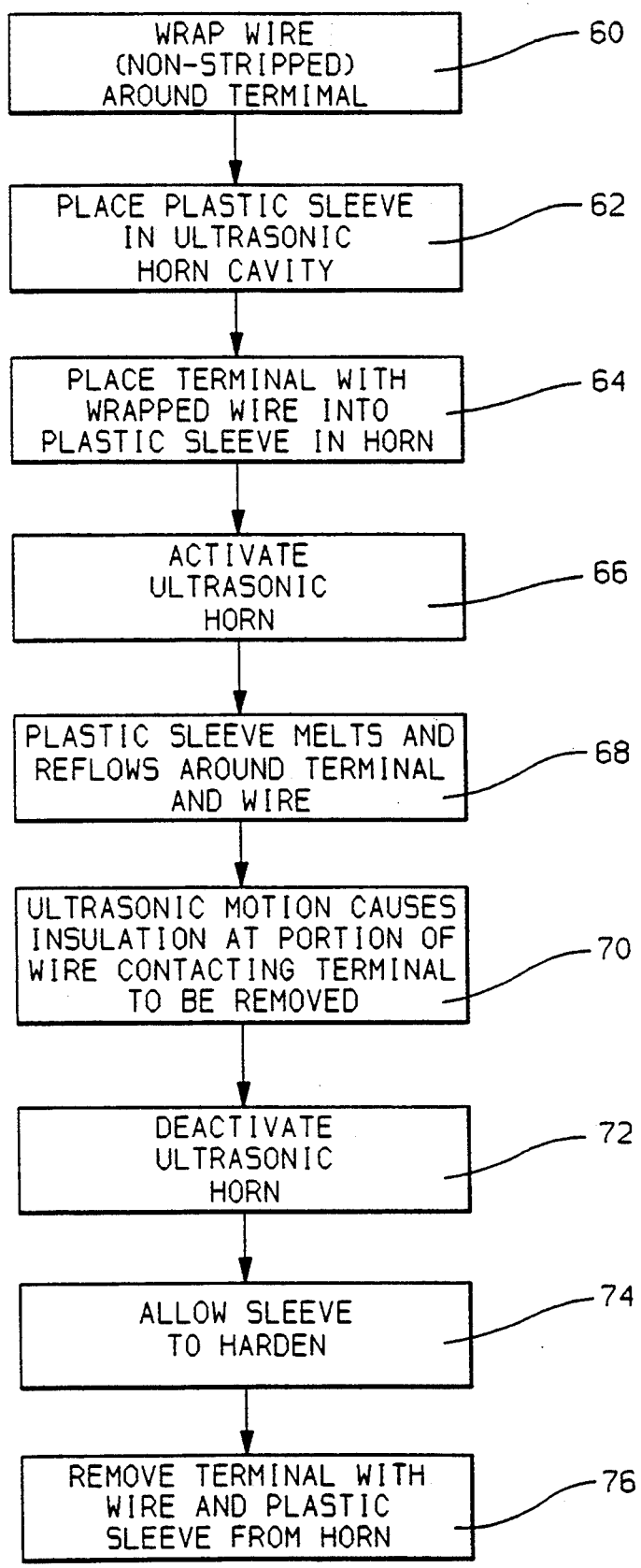
FIG. 8 illustrates the steps according to the method of this invention.

Referring now to FIG. 8, the method of this invention described above includes the step of winding the wire around the terminal, block 60, which step may be made without stripping the wire. At block 62, the plastic cap is placed in the ultrasonic horn cavity. At block 64, the terminal with the wound wire is placed into the plastic cap in the horn. The horn is activated at block 66 and the plastic cap melts and reflows around the terminal and wire at block 68. Also during the activation of the ultrasonic horn, the resulting friction and heat from the ultrasonic activity causes the insulation at the portion of the wire contacting the terminal to be removed, block 70, allowing electrical contact between the wire and the terminal. The ultrasonic horn is then deactivated, block 72, and the plastic sleeve is allowed to cool and harden, block 74. The terminal with the wire and plastic cap are removed from the horn, block 76, with the plastic cap rehardened and retaining the wire and electrical contact with the terminal 12.

In the above described method, the plastic sleeve is placed in the horn and the end of the terminal with the wound wire is placed within the cavity in the cap, steps 62 and 64. These two steps can be reversed in order. The plastic cap may be first placed on the terminal, over the end with the wound wire. The unit of the cap, terminal and wound wire is then placed in the cavity in the horn and the steps 66–76 are performed as above.

As can be seen by the above description of the method, apparatus and system of this invention, no wire stripping step or equipment is needed, no fluxing and no soldering equipment is needed and wire wrapping equipment is replaced with wire winding equipment to terminate wire onto the terminal 12.

In the above described implementation, terminal 12 is assumed to be cylindrical shaped having a circular-like crossed section. However, terminal 12 may be of different shapes including a square, triangular and irregular as long as it may retain the wound wire and be fitted into a plastic cap in an ultrasonic horn.

After the wire is terminated to the terminal 12, the device being assembled, whether a transformer, inductor, solenoid or other type of motor, or other form of device, is then completed in a manner well known to those skilled in the art.

In the above described implementations of this invention, the wire is not stripped because stripping is not necessary according to this invention. However, the wire may be stripped if an implementer of this invention so chooses, and the plastic encapsulation process continued as described above.

Various improvements and modifications to this invention may occur to those skilled in the art and such improvements and modifications will fall within the scope of this invention as set forth below.

The embodiments of the invention in which an exclusive property or privilege is claimed are defined as follows:

1. An apparatus comprising:
a terminal having an end portion;
a wire having a wound portion wound around the end portion of the terminal;
the wire comprising a metal conducting portion and an insulating nonconducting portion, the metal conducting portion making electrical contact with the terminal at a plurality of points of physical contact with the terminal, the insulating portion being removed at said points making electrical contact but remaining at other portions of the wound wire; and
a plastic encapsulation comprising plastic flowed around and encapsulating the end of the terminal and wound portion of the wire, wherein said plastic is molded to the contour of the terminal and wound portion of the wire.

2. An apparatus comprising:
a terminal having an end portion around which is wound termination wire, and a plastic sleeve molded around the end portion of the terminal and the wound wire, having portions of the plastic sleeve molding flowed into the contour of the end portion and wound termination, wherein the wound wire makes metal-to-metal contact with the terminal at various points in the winding.

3. The apparatus set forth in claim 2, also comprising particles of wire insulation dispersed in the molded plastic sleeve.

* * * * *